US009662642B2

(12) United States Patent
Xie et al.

(10) Patent No.: US 9,662,642 B2
(45) Date of Patent: May 30, 2017

(54) SYNTHESIS OF ALUMINOSILICATE ZEOLITE SSZ-98

(71) Applicant: Chevron U.S.A. Inc., San Ramon, CA (US)

(72) Inventors: Dan Xie, Richmond, CA (US); Cong-Yan Chen, Kensington, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 15/169,859

(22) Filed: Jun. 1, 2016

(65) Prior Publication Data

US 2016/0375428 A1   Dec. 29, 2016

Related U.S. Application Data

(60) Provisional application No. 62/186,272, filed on Jun. 29, 2015.

(51) Int. Cl.
C01B 39/30 (2006.01)
B01J 29/50 (2006.01)
C01B 39/48 (2006.01)
C01B 39/02 (2006.01)
B01J 35/00 (2006.01)
B01J 35/02 (2006.01)

(52) U.S. Cl.
CPC ............. B01J 29/50 (2013.01); C01B 39/305 (2013.01); B01J 35/002 (2013.01); B01J 35/023 (2013.01); B01J 2229/186 (2013.01); C01B 39/026 (2013.01); C01B 39/48 (2013.01)

(58) Field of Classification Search
CPC ............................... C01B 39/305; B01J 29/50
See application file for complete search history.

(56) References Cited

U.S. PATENT DOCUMENTS

| 4,331,643 A | 5/1982 | Rubin et al. | |
| 9,409,786 B2 * | 8/2016 | Xie | ........................ C01B 39/305 |
| 9,416,017 B2 * | 8/2016 | Xie | ........................ C01B 39/305 |
| 2016/0001273 A1 * | 1/2016 | Xie | ........................... B01J 29/56 |
| | | | 423/213.5 |
| 2016/0375428 A1 * | 12/2016 | Xie | ........................... B01J 29/70 |
| | | | 423/704 |

OTHER PUBLICATIONS

International Search Report, International Appl. No. PCT/US2016/035167, mailed Aug. 25, 2016.
M.L. Occelli, R.A. Innes, S.S. Pollack and J.V. Sanders "Quaternary ammonium cation effects on the crystallization of offretite-erionite type zeolites: Part 1. Synthesis and catalytic properties" Zeolites 1987, 7, 265-271.

* cited by examiner

Primary Examiner — David M Brunsman
(74) Attorney, Agent, or Firm — Terrence M. Flaherty

(57) ABSTRACT

A method of making for aluminosilicate zeolite SSZ-98 is disclosed using a structure directing agent selected from trimethylphenylammonium cations, cationic 1,4-diazabicyclo[2.2.2]octane, and combinations thereof.

7 Claims, 2 Drawing Sheets

US 9,662,642 B2

SYNTHESIS OF ALUMINOSILICATE ZEOLITE SSZ-98

CROSS-REFERENCE TO RELATED APPLICATIONS

This application claims the priority benefit of U.S. Provisional Application No. 62/186,272, filed Jun. 29, 2015, which is incorporated herein by reference.

TECHNICAL FIELD

This disclosure relates generally to a method for preparing aluminosilicate zeolite SSZ-98 using a structure directing agent selected from trimethylphenylammonium cations, cationic 1,4-diazabicyclo[2.2.2]octane, and combinations thereof.

BACKGROUND

Molecular sieves are a commercially important class of crystalline materials. They have distinct crystal structures with ordered pore structures which are demonstrated by distinct X-ray diffraction patterns. The crystal structure defines cavities and pores which are characteristic of the different species.

Molecular sieves are classified by the Structure Commission of the International Zeolite Association (IZA) according to the rules of the IUPAC Commission on Zeolite Nomenclature. According to this classification, framework type zeolites and other crystalline microporous molecular sieves, for which a structure has been established, are assigned a three letter code and are described in the "Atlas of Zeolite Framework Types," Sixth Revised Edition, Elsevier (2007).

ERI framework type materials are characterized by three-dimensional 8-membered-ring pore/channel systems containing double-six-rings (d6R) and cages. Small pore zeolites containing d6R building units and cages have shown utility in methanol-to-olefins catalysis and in the selective catalytic reduction of nitrogen oxides ($NO_x$) to name some of the more important commercial applications.

U.S. Patent Application Publication Nos. 2016/0002059 and 2016/0002060 disclose an ERI framework type molecular sieve designated SSZ-98 and its synthesis using N,N'-dimethyl-1,4-diazabicyclo[2.2.2]octane dications as a structure directing agent.

According to the present disclosure, molecular sieve SSZ-98 has now been synthesized using a structure directing agent selected from trimethylphenylammoniun cations, cationic 1,4-diazobicyclo[2.2.2]octane, and combinations thereof.

SUMMARY

In one aspect, there is provided a method of preparing an aluminosilicate SSZ-98 type zeolite by contacting under crystallization conditions (1) at least one source of silicon; (2) at least one source of aluminum; (3) a source of alkali metal; (4) a structure directing agent selected from trimethylphenylammonium cations, cationic 1,4-diazabicyclo[2.2.2]octane; and combinations thereof; and (5) hydroxide ions.

In another aspect, there is provided a process for preparing an aluminosilicate SSZ-98 zeolite by: (a) preparing a reaction mixture containing: (1) a source of silicon oxide; (2) a source of aluminum oxide; (3) a source of an alkali metal; (4) a structure directing agent selected from one or more of trimethylphenylammonium cations and cationic 1,4-diazabicyclo[2.2.2]octane; (5) hydroxide ions; and (6) water; and (b) subjecting the reaction mixture to crystallization conditions sufficient to form crystals of the zeolite.

In one aspect, there is provided an aluminosilicate SSZ-98 zeolite comprising within its pore structure a cation selected from trimethylphenylammonium cations, cationic 1,4-diazabicyclo[2.2.2]octane, and combinations thereof.

DETAILED DESCRIPTION

Introduction

Figure 1:
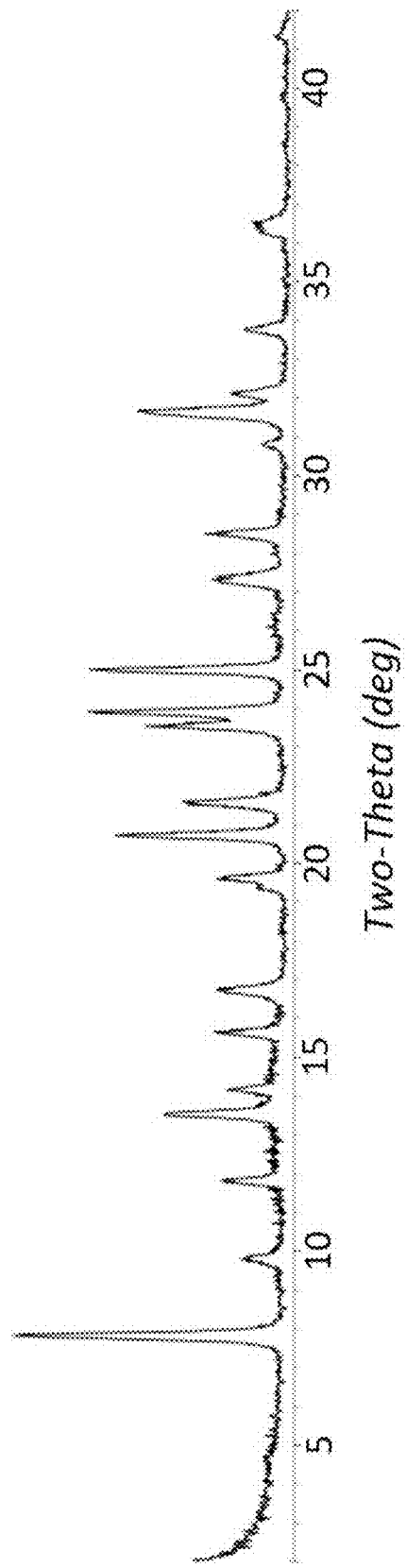
FIG. 1 is a powder X-ray diffraction (XRD) pattern of the as-synthesized zeolite prepared in Example 1.

The following terms will be used throughout the specification and will have the following meanings unless otherwise indicated.

The term "framework type" is used in the sense described in the "Atlas of Zeolite Framework Types," Sixth Revised Edition, Elsevier (2007).

As used herein, the numbering scheme for the Periodic Table Groups is as disclosed in Chem. Eng. News, 1985, 63(5), 26-27.

In preparing aluminosilicate SSZ-98 zeolites, a trimethylphenylammonium cation, cationic 1,4-diazabicyclo[2.2.2] octane, or a combination thereof is used as a structure directing agent, also known as a crystallization template.

The cationic structure directing agent is associated with anions which can be any anion that is not detrimental to the formation of the zeolite. Representative anions include elements from Group 17 of the Periodic Table (e.g., fluoride, chloride, bromide, and iodide), hydroxide, sulfate, tetrafluoroborate, acetate, carboxylate, and the like.

Reaction Mixture

In general, aluminosilicate SSZ-98 zeolite is prepared by: (a) preparing a reaction mixture containing (1) a source of silicon oxide; (2) a source of aluminum oxide; (3) a source of an alkali metal (M); (4) a structure directing agent (Q) selected from trimethylphenylammonium cations, cationic 1,4-diazabicyclo[2.2.2]octane, and combinations thereof; (5) hydroxide ions; and (6) water; and (b) subjecting the reaction mixture to crystallization conditions sufficient to form crystals of the zeolite.

The composition of the reaction mixture from which the zeolite is formed, in terms of mole ratios, is identified in Table 1 below:

TABLE 1

| Reactants | Broad | Exemplary |
|---|---|---|
| $SiO_2/Al_2O_3$ | 10 to 100 | 15 to 80 |
| $M/SiO_2$ | 0.05 to 0.50 | 0.05 to 0.25 |
| $Q/SiO_2$ | 0.10 to 0.70 | 0.10 to 0.35 |
| $OH/SiO_2$ | 0.20 to 1.00 | 0.40 to 0.80 |
| $H_2O/SiO_2$ | 5 to 50 | 15 to 50 | wherein M and Q are as described herein above.

Suitable sources of silicon oxide include fumed silica, precipitated silicates, silica hydrogel, silicic acid, colloidal silica, tetra-alkyl orthosilicates, and silica hydroxides.

Suitable sources of aluminum oxide include hydrated alumina and water-soluble aluminum salts (e.g., aluminum nitrate).

Any M-containing compound which is not detrimental to the crystallization process is suitable. In one embodiment, the alkali metal is selected from sodium, potassium, and combinations thereof. Sources for such alkali metals include oxides, hydroxides, nitrates, sulfates, halides, acetates, oxalates and citrates thereof.

The reaction mixture may contain seed crystals of a molecular sieve material. It is well known that seeding a zeolite synthesis mixture frequently has beneficial effects, for example, in controlling the particle size of the product, avoiding the need for an organic template, accelerating synthesis, and/or improving the proportion of product that is of the intended framework type. In some embodiments, the synthesis of the crystalline zeolite is facilitated by the presence of from 0.01 to 25 wt. %, e.g., from 1 to 5 wt. %, seed crystals based on total weight of silicon oxide of the reaction mixture. The seed crystals can be isostructural with the desired zeolite, for example the product of a previous synthesis, or can be a heterostructural crystalline material.

For each embodiment described herein, the reaction mixture can be supplied by more than one source. Also, two or more reaction components can be provided by one source. Combined sources of two or more of the components M, $Al_2O_3$ and $SiO_2$ can include, for example, sodium aluminate, clays or treated clays (e.g., metakaolin), and aluminosilicate zeolites (e.g., zeolite Y).

The reaction mixture can be prepared either batch wise or continuously. Crystal size, morphology and crystallization time of the crystalline zeolite described herein can vary with the nature of the reaction mixture and the crystallization conditions.

Crystallization and Post-Synthesis Treatment

Crystallization of the zeolite can be carried out under either static, tumbled or stirred conditions in a suitable reactor vessel, such as for example polypropylene jars or Teflon-lined or stainless steel autoclaves, at a temperature of from 125° C. to 200° C. for a time sufficient for crystallization to occur at the temperature used, e.g., from 1 day to 14 days. The reaction mixture is usually reacted under autogenous pressure, or optionally in the presence of a gas such as nitrogen.

Once the zeolite crystals have formed, the solid product is separated from the reaction mixture by standard mechanical separation techniques such as centrifugation or filtration. The crystals are water-washed and then dried to obtain the as-synthesized zeolite crystals. The drying step is typically performed at a temperature of less than 200° C.

As a result of the crystallization process, the recovered crystalline zeolite product contains within its pores at least a portion of the structure directing agent used in the synthesis.

The structure directing agent is typically at least partially removed from the zeolite by calcination before use. Calcination consists essentially of heating the zeolite comprising the structure directing agent at a temperature of from 200° C. to 800° C. in the presence of an oxygen-containing gas, optionally in the presence of steam. The structure directing agent can also be removed by photolysis techniques as described in U.S. Pat. No. 6,960,327.

To the extent desired and depending on the composition of the zeolite, any cations in the as-synthesized or calcined zeolite can be replaced in accordance with techniques well known in the art by ion exchange with other cations. Preferred replacing cations include metal ions, hydrogen ions, hydrogen precursor, e.g., ammonium ions and mixtures thereof. Particularly preferred cations are those which tailor the catalytic activity for certain chemical conversion reactions. These include hydrogen, rare earth metals and metals of Groups 2 to 15 of the Periodic Table of the Elements. As used herein, the term "as-synthesized" refers to the zeolite in its form after crystallization, prior to removal of the SDA cation.

The zeolite disclosed herein can be formulated with into a catalyst composition by combination with other materials, such as binders and/or matrix materials, which provide additional hardness or catalytic activity to the finished catalyst.

The relative proportions of aluminosilicate SSZ-98 zeolite and matrix may vary widely with the SSZ-98 content ranging from 1 to 90% by weight, and more usually in the range of from 2 to 80% by weight of the composite.

Characterization of the Zeolite

In its as-synthesized and anhydrous form, the aluminosilicate SSZ-98 zeolite disclosed herein has a composition comprising, in terms of mole ratios, as described in Table 2 below:

TABLE 2

|  | Broad | Exemplary |
| --- | --- | --- |
| $SiO_2/Al_2O_3$ | 10 to 50 | 15 to 35 |
| $Q/SiO_2$ | 0.02 to 0.20 | 0.05 to 0.15 | wherein Q is selected from trimethylphenylammonium cations, cationic 1,4-diazabicyclo[2.2.2]octane, and combinations thereof.

In certain aspects, the as-synthesized aluminosilicate SSZ-98 zeolite may have a $SiO_2/Al_2O_3$ mole ratio of 10 to 50. (e.g., 10 to 45, 10 to 40, 10 to 35, 10 to 30, 10 to 25, 10 to 20, from 12 to 45, 12 to 40, 12 to 35, 12 to 30, 12 to 25, or 12 to 20).

It should be noted that the as-synthesized form of the zeolite described herein may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

SSZ-98 is characterized by an X-ray diffraction pattern which, in the as-synthesized form of the zeolite, includes at least the lines set out in Table 3 below.

TABLE 3

| Characteristic Peaks for As-Synthesized SSZ-98 | | |
| --- | --- | --- |
| 2-Theta[a] | d-spacing (nm) | Relative Intensity[b] |
| 7.78 | 1.136 | VS |
| 9.74 | 0.907 | W |
| 11.79 | 0.750 | W |
| 13.46 | 0.657 | S |
| 14.10 | 0.627 | W |
| 15.53 | 0.570 | M |
| 16.62 | 0.533 | W |
| 19.51 | 0.455 | W |
| 20.56 | 0.432 | VS |
| 21.40 | 0.415 | M |
| 23.38 | 0.380 | S |
| 23.76 | 0.374 | VS |
| 24.88 | 0.358 | W |

[a] ±0.20
[b] The powder XRD patterns provided are based on a relative intensity scale in which the strongest line in the X-ray diffraction pattern is assigned a value of 100: W = weak (>0 to ≤20); M = medium (>20 to ≤40); S = strong (>40 to ≤60); VS = very strong (>60 to ≤100).

In its calcined form, the aluminosilicate SSZ-98 zeolite disclosed herein has a composition comprising the molar relationship:

$$Al_2O_3:(n)SiO_2$$

wherein n has a value of from 10 to 50 (e.g., 10 to 45, 10 to 40, 10 to 35, 10 to 30, 10 to 25, 10 to 20, from 12 to 45, 12 to 40, 12 to 35, 12 to 30, 12 to 25, or 12 to 20).

SSZ-98 is characterized by an X-ray diffraction pattern which, in the calcined form of the zeolite, includes at least the lines set out in Table 4.

TABLE 4

Characteristic Peaks for Calcined SSZ-98

| 2-Theta[a] | d-spacing (nm) | Relative Intensity[b] |
|---|---|---|
| 7.76 | 1.138 | VS |
| 9.78 | 0.904 | W |
| 11.79 | 0.750 | W |
| 13.45 | 0.658 | VS |
| 14.07 | 0.629 | W |
| 15.51 | 0.571 | W |
| 16.61 | 0.533 | W |
| 19.50 | 0.455 | W |
| 20.54 | 0.432 | S |
| 21.39 | 0.415 | W |
| 23.37 | 0.380 | M |
| 23.73 | 0.375 | S |
| 24.92 | 0.357 | W |

[a]±0.20
[b]The powder XRD patterns provided are based on a relative intensity scale in which the strongest line in the X-ray diffraction pattern is assigned a value of 100: W = weak (>0 to ≤20); M = medium (>20 to ≤40); S = strong (>40 to ≤60); VS = very strong (>60 to ≤100).

SSZ-98 prepared in accordance with this disclosure is preferably substantially free of non-ERI framework type material. By "substantially free of non-ERI framework type material" is meant that the SSZ-98 composition disclosed herein contains less than 2.5% non-ERI framework type character (e.g., less than 1% non-ERI framework type character, less than 0.5% non-ERI framework type character, or no measurable non-ERI framework type character), as measured by X-ray diffraction. The presence of these impurities can be determined and quantified by analysis of the X-ray diffraction pattern of a sample. The term "non-ERI framework type material" as used herein means any material that does not contain crystalline zeolite of the ERI framework type. Examples of such non-ERI framework type material include amorphous material, CHA framework type zeolites, LTL framework type zeolites, and OFF framework type zeolites.

Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can result from variations in the organic compound used in the preparation. Calcination can also cause minor shifts in the X-ray diffraction pattern. Notwithstanding these minor pertubations, the basic crystal structure remains unchanged.

The powder X-ray diffraction patterns presented herein were collected by standard techniques. The radiation was CuKα radiation. The peak heights and the positions, as a function of 2θ where θ is the Bragg angle, were read from the relative intensities of the peaks, and d, the interplanar spacing corresponding to the recorded lines, can be calculated.

Aluminosilicate SSZ-98 may have a rod-like crystal morphology or a plate crystal morphology.

EXAMPLES

The following illustrative examples are intended to be non-limiting.

Example 1

0.80 g of a 45% KOH solution, 0.95 g of deionized water and 1.00 g of CBV760 Y-zeolite (Zeolyst International, SiO$_2$/Al$_2$O$_3$ mole ratio=60) were mixed together in a Teflon liner. Then, 3.70 g of a 20% trimethylphenylammonium hydroxide solution was added to the mixture. The resulting gel was stirred until it became homogeneous. The liner was capped and placed within a Parr steel autoclave reactor. The autoclave was placed in an oven and heated at 135° C. for 6 days. The solid products were recovered from the cooled reactor by centrifugation, washed with deionized water and dried at 95° C.

Figure 2:
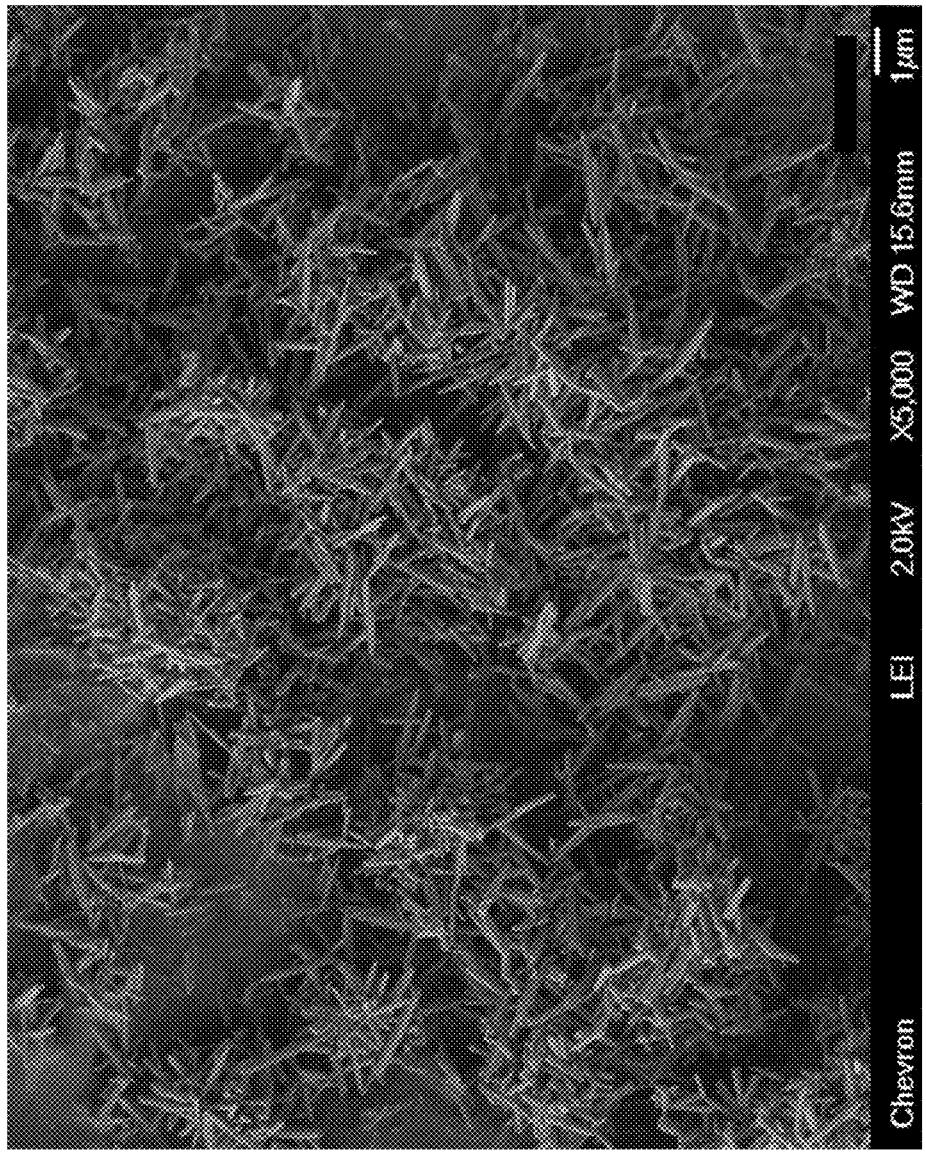
FIG. 2 is a Scanning Electron Micrograph (SEM) image of the as-synthesized zeolite prepared in Example 1.

The resulting product was analyzed by powder XRD and SEM. The powder XRD pattern is shown in FIG. 1 and indicates that the material is a pure SSZ-98 zeolite. The SEM image is shown in FIG. 2 and indicates that the product is a uniform field of rod-like or stick-like crystals rather than the wool-like fibrous masses of naturally occurring erionite. Naturally occurring erionite may pose health risks to those who breathe in the fibers.

The product had a SiO$_2$/Al$_2$O$_3$ mole ratio of 15.3, as determined by ICP elemental analysis.

Example 2

0.70 g of a 45% KOH solution, 1.00 g of deionized water and 1.00 g of CBV780 Y-zeolite (Zeolyst International, SiO$_2$/Al$_2$O$_3$ mole ratio=80) were mixed together in a Teflon liner. Then, 3.70 g of a 20% trimethylphenylammonium hydroxide solution was added to the mixture. The resulting gel was stirred until it became homogeneous. The liner was capped and placed within a Parr steel autoclave reactor. The autoclave was placed in an oven and heated at 135° C. for 6 days. The solid products were recovered from the cooled reactor by centrifugation, washed with deionized water and dried at 95° C.

The resulting zeolite product was identified by powder XRD and SEM as pure SSZ-98.

The product had a SiO$_2$/Al$_2$O$_3$ mole ratio of 17.1, as determined by ICP elemental analysis.

Example 3

0.39 g of a 45% KOH solution, 0.46 g of deionized water and 0.50 g of CBV720 Y-zeolite (Zeolyst International, SiO$_2$/Al$_2$O$_3$ mole ratio=30) were mixed together in a Teflon liner. Then, 1.79 g of a 20% trimethylphenylammonium hydroxide solution was added to the mixture. The resulting gel was stirred until it became homogeneous. The liner was capped and placed within a Parr steel autoclave reactor. The autoclave was placed in an oven and heated at 135° C. for 7 days. The solid products were recovered from the cooled reactor by centrifugation, washed with deionized water and dried at 95° C.

The resulting product was identified by powder XRD to be a mixture of SSZ-98 and LTL framework type zeolites.

Example 4

0.15 g of a 45% KOH solution, 0.05 g of deionized water and 0.50 g of CBV760 Y-zeolite (Zeolyst International, $SiO_2/Al_2O_3$ mole ratio=60) were mixed together in a Teflon liner. Then, 6.81 g of a 10.3% 1,4-diazabicyclo[2.2.2]octane hydroxide solution was added to the mixture. The resulting gel was stirred until it became homogeneous. The liner was capped and placed within a Parr steel autoclave reactor. The autoclave was placed in an oven and heated at 135° C. for 7 days. The solid products were recovered from the cooled reactor by centrifugation, washed with deionized water and dried at 95° C.

The resulting zeolite product was identified by powder XRD and SEM as pure SSZ-98.

The product had a $SiO_2/Al_2O_3$ mole ratio of 12.2, as determined by ICP elemental analysis.

Example 5

1.21 g of a 45% KOH solution, 0.16 g of deionized water and 3.00 g of CBV760 Y-zeolite (Zeolyst International, $SiO_2/Al_2O_3$ mole ratio=60) were mixed together in a Teflon liner. Then, 34.03 g of a 10.3% 1,4-diazabicyclo[2.2.2] octane hydroxide solution was added to the mixture. The resulting gel was stirred until it became homogeneous. The liner was capped and placed within a Parr steel autoclave reactor. The autoclave was placed in an oven and heated at 135° C. for 5 days. The solid products were recovered from the cooled reactor by centrifugation, washed with deionized water and dried at 95° C.

The resulting zeolite product was identified by powder XRD and SEM as pure SSZ-98.

The product had a $SiO_2/Al_2O_3$ mole ratio of 12.5, as determined by ICP elemental analysis.

Example 6

0.40 g of a 45% KOH solution, 0.05 g of deionized water and 1.00 g of CBV780 Y-zeolite (Zeolyst International, $SiO_2/Al_2O_3$ mole ratio=80) were mixed together in a Teflon liner. Then, 13.61 g of a 10.3% 1,4-diazabicyclo[2.2.2] octane hydroxide solution was added to the mixture. The resulting gel was stirred until it became homogeneous. The liner was capped and placed within a Parr steel autoclave reactor. The autoclave was placed in an oven and heated at 135° C. for 5 days. The solid products were recovered from the cooled reactor by centrifugation, washed with deionized water and dried at 95° C.

The resulting product was identified by powder XRD to be a mixture of SSZ-98 and CHA framework type zeolites.

Example 7

5.62 g of a 45% KOH solution, 8.04 g of deionized water and 8.00 g of CBV780 Y-zeolite (Zeolyst International $SiO_2/Al_2O_3$ mole ratio=80) were mixed together in a Teflon liner. Then, 29.62 g of a 20% trimethylphenylammonium hydroxide solution was added to the mixture. The resulting gel was stirred until it became homogenous. The liner was capped and placed within a Parr steel autoclave reactor. The autoclave was placed in an oven and heated at 135° C. for 5 days with tumbling at 43 rpm. The contents of the reactor were filtered, washed with deionized water and dried at 95° C.

The resulting zeolite product was identified by powder XRD and SEM as pure SSZ-98.

The product had a $SiO_2/Al_2O_3$ mole ratio of 17.9, as determined by ICP elemental analysis.

The product, after ammonium ion exchange, gave a residual potassium concentration of 0.84 wt. %.

Example 8

3.21 g of a 45% KOH solution, 3.09 g of a 50% NaOH solution, 15.71 g of deionized water and 8.00 g of CBV780 Y-zeolite (Zeolyst International $SiO_2/Al_2O_3$ mole ratio=80) were mixed together in a Teflon liner. Then, 19.74 g of a 20% trimethylphenylammonium hydroxide solution was added to the mixture. The resulting gel was stirred until it became homogenous. The liner was capped and placed within a Parr steel autoclave reactor. The autoclave was placed in an oven and heated at 135° C. for 5 days with tumbling at 43 rpm. The contents of the reactor were filtered, washed with deionized water and dried at 95° C.

The resulting zeolite product was identified by powder XRD and SEM as pure SSZ-98.

The product had a $SiO_2/Al_2O_3$ mole ratio of 19.4, as determined by ICP elemental analysis.

Example 9

1.61 g of a 45% KOH solution, 4.12 g of 50% NaOH solution, 16.08 g of deionized water and 8.00 g of CBV780 Y-zeolite (Zeolyst International $SiO_2/Al_2O_3$ mole ratio=80) were mixed together in a Teflon liner. Then, 19.74 g of a 20% trimethylphenylammonium hydroxide solution was added to the mixture. The resulting gel was stirred until it became homogenous. The liner was capped and placed within a Parr steel autoclave reactor. The autoclave was placed in an oven and heated at 135° C. for 5 days with tumbling at 43 rpm. The contents of the reactor were filtered, washed with deionized water and dried at 95° C.

The resulting zeolite product was identified by powder XRD and SEM as pure SSZ-98.

The product had a $SiO_2/Al_2O_3$ mole ratio of 18.8, as determined by ICP elemental analysis.

Example 10

0.50 g of a 45% KOH solution, 2.90 g of 50% NaOH solution, 10.17 g of deionized water and 5.00 g of CBV760 Y-zeolite (Zeolyst International $SiO_2/Al_2O_3$ mole ratio=60) were mixed together in a Teflon liner. Then, 12.34 g of a 20% trimethylphenylammonium hydroxide solution was added to the mixture. The resulting gel was stirred until it became homogenous. The liner was capped and placed within a Parr steel autoclave reactor. The autoclave was placed in an oven and heated at 135° C. for 5 days with tumbling at 43 rpm. The contents of the reactor were filtered, washed with deionized water and dried at 95° C.

The resulting zeolite product was identified by powder XRD and SEM as pure SSZ-98.

The product had a $SiO_2/Al_2O_3$ mole ratio of 17.2, as determined by ICP elemental analysis.

Example 11

Calcination of SSZ-98

The as-synthesized product of Example 1 was calcined inside a muffle furnace under a flow of air heated to 595° C. at a rate of 1° C./minute and held at 595° C. for 5 hours, cooled and then analyzed by powder XRD. The powder XRD pattern of the resulting product indicated that the material remained stable after calcination to remove the organic SDA.

Example 12

Ammonium-Ion Exchange of SSZ-98

The calcined material from Example 11 (K-SSZ-98) was treated with 10 mL (per g of zeolite) of a 1N ammonium nitrate solution for 2 hours at 90° C. The solution was cooled, decanted off and the same process repeated.

The product (NH$_4$-SSZ-98) after drying was subjected to micropore volume analysis using N$_2$ as the adsorbate and via the BET method. The zeolite had a micropore volume of 0.26 cm$^3$/g.

Example 13

Methanol Conversion

Ammonium-exchange SSZ-98 was pelletized at 5 kpsi, crushed and sieved to 20-40 mesh. 0.20 g of catalyst (diluted 4:1 v/v with alundum) was centered in a down-flow stainless steel tube reactor in a split tube furnace. The catalytic reaction was carried out at atmospheric pressure. The catalyst was preheated in-situ under flowing nitrogen at 400° C. A feed of pure methanol was introduced into the reactor at a rate of 0.324 cc/h for 1.3 h$^{-1}$ WHSV in a 30 cc/min flow of nitrogen as carrier gas. Reaction products from the product flow coming from the reactor outlet were injected automatically into an on-line Agilent gas chromatograph with an FID detector and analyzed in-situ. The results are set forth in Table 5 below.

TABLE 5

| Time on Stream, h | 0.50 | 0.87 | 1.24 | 1.61 | 1.98 | 2.35 |
|---|---|---|---|---|---|---|
| Conversion, wt. % | 100.0 | 100.0 | 100.0 | 100.0 | 100.0 | 98.3 |
| Selectivity, wt. % | | | | | | |
| C$_1$-C$_3$ Paraffins | 31.1 | 23.5 | 17.9 | 12.5 | 9.5 | 7.5 |
| Ethylene | 22.8 | 28.4 | 33.7 | 41.8 | 50.0 | 57.5 |
| Propylene | 20.8 | 24.5 | 26.1 | 26.6 | 25.3 | 21.5 |
| Butanes and Butenes | 16.8 | 16.6 | 14.9 | 12.1 | 9.4 | 8.0 |
| C$_{5+}$ | 8.6 | 7.0 | 7.4 | 7.0 | 5.9 | 5.5 |
| Ethylene/Propylene Molar Ratio | 1.64 | 1.74 | 1.94 | 2.36 | 2.97 | 4.02 |

The products shown above are consistent with those for a small pore zeolite in terms of product shape-selectivity in the reaction of methanol being catalytically converted to olefins of mostly C$_2$-C$_4$ arrange. No aromatic products were observed.

As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

All documents cited in this application are herein incorporated by reference in their entirety to the extent such disclosure is not inconsistent with this text.

The invention claimed is:

1. A method of preparing an aluminosilicate SSZ-98 zeolite, comprising:
 (a) preparing a reaction mixture containing:
  (1) a source of silicon oxide;
  (2) a source of aluminum oxide;
  (3) a source of an alkali metal (M);
  (4) a structure directing agent (Q) selected from trimethylphenylammonium cations, cationic 1,4-diazabicyclo[2.2.2]octane, and combinations thereof;
  (5) hydroxide ions; and
  (6) water; and
 (b) subjecting the reaction mixture to crystallization condition sufficient to form crystals of the zeolite.

2. The method of claim 1, wherein the zeolite is prepared from a reaction mixture comprising, in terms of mole ratios, the following:

| SiO$_2$/Al$_2$O$_3$ | 10 to 100 |
|---|---|
| M/SiO$_2$ | 0.05 to 0.50 |
| Q/SiO$_2$ | 0.10 to 0.70 |
| OH/SiO$_2$ | 0.20 to 1.00 |
| H$_2$O/SiO$_2$ | 5 to 50. |

3. The method of claim 1, wherein the zeolite is prepared from a reaction comprising, in terms of mole ratios, the following:

| SiO$_2$/Al$_2$O$_3$ | 15 to 80 |
|---|---|
| M/SiO$_2$ | 0.05 to 0.25 |
| Q/SiO$_2$ | 0.10 to 0.35 |
| OH/SiO$_2$ | 0.40 to 0.80 |
| H$_2$O/SiO$_2$ | 15 to 50. |

4. The method of claim 1, wherein the alkali metal is selected from sodium, potassium, and combinations thereof.

5. An aluminosilicate SSZ-98 zeolite comprising within its pore structure a cation selected from trimethylphenylammonium cations, cationic 1,4-diazabicyclo[2.2.2]octane, and combinations thereof.

6. The zeolite of claim 5, wherein the zeolite has a SiO$_2$/Al$_2$O$_3$ mole ratio of from 10 to 50.

7. The zeolite of claim 5, wherein the zeolite has a SiO$_2$/Al$_2$O$_3$ mole ratio of from 10 to 20.

* * * * *